United States Patent
Dockery et al.

(10) Patent No.: US 6,830,687 B2
(45) Date of Patent: Dec. 14, 2004

(54) FUEL STRAINER ASSEMBLY

(75) Inventors: Randall L. Dockery, Flushing, MI (US); Dale Jones, Flushing, MI (US)

(73) Assignee: Delphi Technologies, Inc., Troy, MI (US)

( * ) Notice: Subject to any disclaimer, the term of this patent is extended or adjusted under 35 U.S.C. 154(b) by 52 days.

(21) Appl. No.: 10/348,258

(22) Filed: Jan. 21, 2003

(65) Prior Publication Data

US 2004/0140257 A1 Jul. 22, 2004

(51) Int. Cl.$^7$ .................. B01D 35/02; F02M 37/14
(52) U.S. Cl. ................ 210/416.4; 210/232; 210/463
(58) Field of Search ..................... 210/232, 416.1, 210/416.4, 460, 463

(56) References Cited

U.S. PATENT DOCUMENTS

| | | | |
|---|---|---|---|
| 222,140 A | 12/1879 | Lindsay | |
| 1,826,170 A | 10/1931 | Duggan | |
| 1,890,984 A | 12/1932 | Gulick | |
| 2,192,438 A | 3/1940 | Gulick | |
| 2,318,220 A | 5/1943 | Haselwood | |
| 2,335,096 A | 11/1943 | Zech | |
| 2,448,212 A | 8/1948 | Dewey | |
| 2,508,952 A | 5/1950 | Kline | |
| 2,633,425 A | 3/1953 | Thompson | |
| 2,788,125 A | 4/1957 | Webb | |
| 3,826,372 A | * 7/1974 | Bell | ........... 210/172 |
| 4,242,206 A | * 12/1980 | Estabrooke | ........... 210/489 |
| 4,424,422 A | 1/1984 | Bell et al. | |
| 4,571,481 A | 2/1986 | Leary | |
| 4,618,422 A | * 10/1986 | Sasaki et al. | ........... 210/172 |
| 4,626,347 A | 12/1986 | Neglio | |
| 4,997,555 A | 3/1991 | Church et al. | |
| 5,146,901 A | 9/1992 | Jones | |
| 5,159,915 A | 11/1992 | Saito et al. | |
| 5,293,899 A | 3/1994 | Kwon | |
| 5,378,358 A | 1/1995 | Park | |
| 5,441,637 A | * 8/1995 | Gutjahr et al. | ........... 210/232 |
| 5,547,568 A | 8/1996 | Sasaki | |
| 5,665,229 A | 9/1997 | Fitzpatrick et al. | |
| 5,716,522 A | 2/1998 | Chilton et al. | |
| 6,170,470 B1 | 1/2001 | Clarkson et al. | |
| 6,176,133 B1 | 1/2001 | Hutter et al. | |
| 6,179,577 B1 | 1/2001 | Meyer | |
| 6,193,885 B1 | 2/2001 | Campbell | |
| 6,361,691 B1 | 3/2002 | Dockery et al. | |
| 6,638,423 B2 | 10/2003 | Dockery | |

FOREIGN PATENT DOCUMENTS

| | | |
|---|---|---|
| EP | 0 743 445 A1 | 11/1996 |
| EP | 0 743 445 B 1 | 9/1998 |
| RU | 2177071 | 12/2001 |

* cited by examiner

*Primary Examiner*—Fred G. Prince
(74) *Attorney, Agent, or Firm*—Jimmy L. Funke

(57) ABSTRACT

A fuel strainer assembly includes a filtration member and an inlet connector connected to the filtration member for connection to an inlet of a fuel pump. The fuel strainer assembly also includes a push pad connected to the filtration member. The fuel strainer assembly further includes a compression retainer operatively supported by the push pad to engage the inlet connector to cause an interference fit between the inlet connector and the inlet of the fuel pump to secure the inlet connector to the fuel pump.

20 Claims, 3 Drawing Sheets

US 6,830,687 B2

FUEL STRAINER ASSEMBLY

TECHNICAL FIELD

The present invention relates generally to fuel tanks for vehicles and, more particularly, to a fuel strainer assembly for a fuel tank of a vehicle.

BACKGROUND OF THE INVENTION

It is known to provide a fuel tank for a fuel system in a vehicle to hold fuel to be used by an engine of the vehicle. It is also known to provide an electric fuel pump in the fuel tank to pump fuel from the fuel tank to the engine. In-tank electric fuel pumps typically require a filter to remove particulate contaminants from the fuel prior to entering the fuel pump. This pre-filtration is commonly accomplished by connecting a fuel strainer assembly to an inlet of the fuel pump. However, this connection interface must secure the mating parts for a life of the fuel pump.

One known connection is a press fit connection between an outside diameter of a snout extending from an inlet body of the fuel pump and an inside diameter of a connector body integral to the fuel strainer assembly. Another known connection secures the fuel strainer assembly to the inlet of the fuel pump using a post extending from the inlet body and a pal nut fastener to retain the fuel strainer assembly. However, both of these connections require a feature to be added to the inlet body (i.e., a snout or a post) of the fuel pump. As a result, these features add unnecessary complexity to the inlet body of the fuel pump and are not production feasible for a manufacturing process (i.e. compression molding).

Therefore, it is desirable to provide a new fuel strainer assembly for a fuel tank in a vehicle that has a connection to attach a fuel strainer to an inlet of the fuel pump. It is also desirable to provide a fuel strainer assembly for a fuel tank in a vehicle that eliminates additional parts for connection of the fuel strainer to the inlet of the fuel pump. It is further desirable to provide a fuel strainer assembly for a fuel tank in a vehicle that provides orientation and anti-rotation of the fuel strainer relative to the inlet of the fuel pump.

SUMMARY OF THE INVENTION

It is, therefore, one object of the present invention to provide a fuel strainer assembly for a fuel tank in a vehicle.

It is another object of the present invention to provide a fuel strainer assembly for a fuel tank in a vehicle that connects a fuel strainer to an inlet of a fuel pump without adding additional parts.

To achieve the foregoing objects, the present invention is a fuel strainer assembly including a filtration member and an inlet connector connected to the filtration member for connection to an inlet of a fuel pump. The fuel strainer assembly also includes a push pad connected to the filtration member. The fuel strainer assembly further includes a compression retainer operatively supported by the push pad to engage the inlet connector to cause an interference fit between the inlet connector and the inlet of the fuel pump to secure the inlet connector to the fuel pump.

One advantage of the present invention is that a new fuel strainer assembly is provided for a fuel tank in a vehicle. Another advantage of the present invention is that the fuel strainer assembly allows contaminant wear resistant materials to be compression molded. Yet another advantage of the present invention is that the fuel strainer assembly allows a fuel strainer to be attached to a fuel pump without the addition of extra features to an inlet body of the fuel pump and eliminates additional parts like a pal nut or retainer. Still another advantage of the present invention is that the fuel strainer assembly provides a mechanism for radial orientation and anti-rotation because the location of the fuel strainer is controlled by the components and not the assembly tooling.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
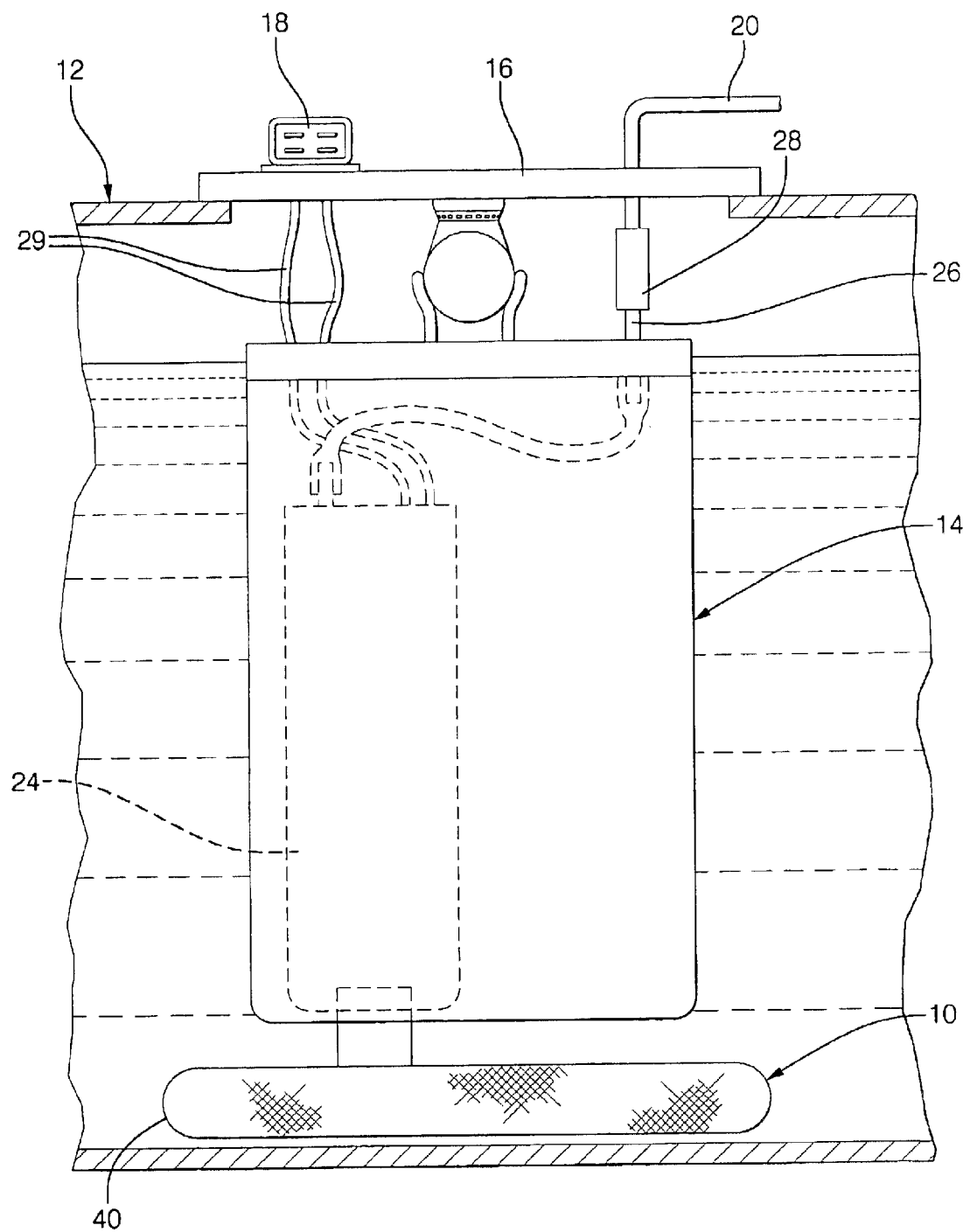
FIG. 1 is a fragmentary elevational view of a fuel strainer assembly, according to the present invention, illustrated in operational relationship with a fuel tank.
Figure 2:
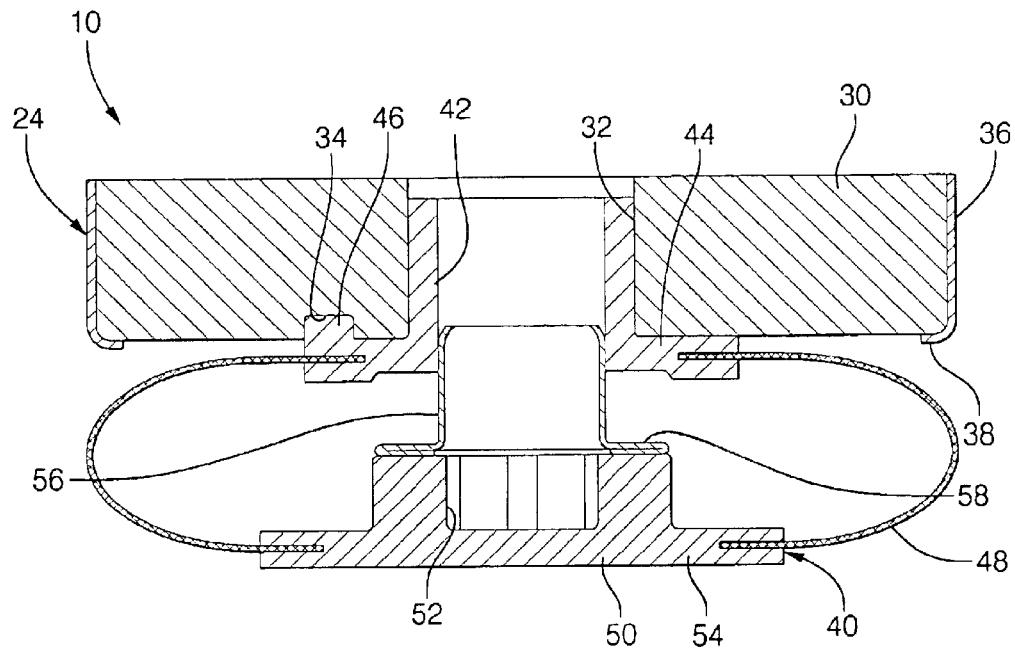
FIG. 2 is a fragmentary elevational view of the fuel strainer assembly of FIG. 1 illustrating pre-assembly.

Referring to the drawings and in particular FIGS. 1 and 2, one embodiment of a fuel strainer assembly 10, according to the present invention, is shown for a fuel tank, generally indicated at 12, in a vehicle (not shown). The fuel tank 12 includes a fuel-sending unit, generally indicated at 14, disposed therein having a removable cover 16 sealed to the top of the fuel tank 12 with an electrical connector 18 and a fuel line connector 20. The fuel-sending unit 14 also includes an electrical fuel pump 24. The fuel-sending unit 14 includes a fuel tube 26 connected to the fuel pump 24 and connected to the fuel line connector 20 by a coupler 28. The fuel strainer assembly 10 is connected to the fuel pump 24 and is positioned close to a bottom of the fuel tank 12. The fuel tank 12 is formed of a metal material or plastic material. It should be appreciated that the fuel strainer assembly 10 may be connected to a fuel module (not shown) or directly to the fuel pump 24. It should also be appreciated that electrical wires 29 interconnect the electrical connector 18 and the fuel pump 24.

Figure 3:
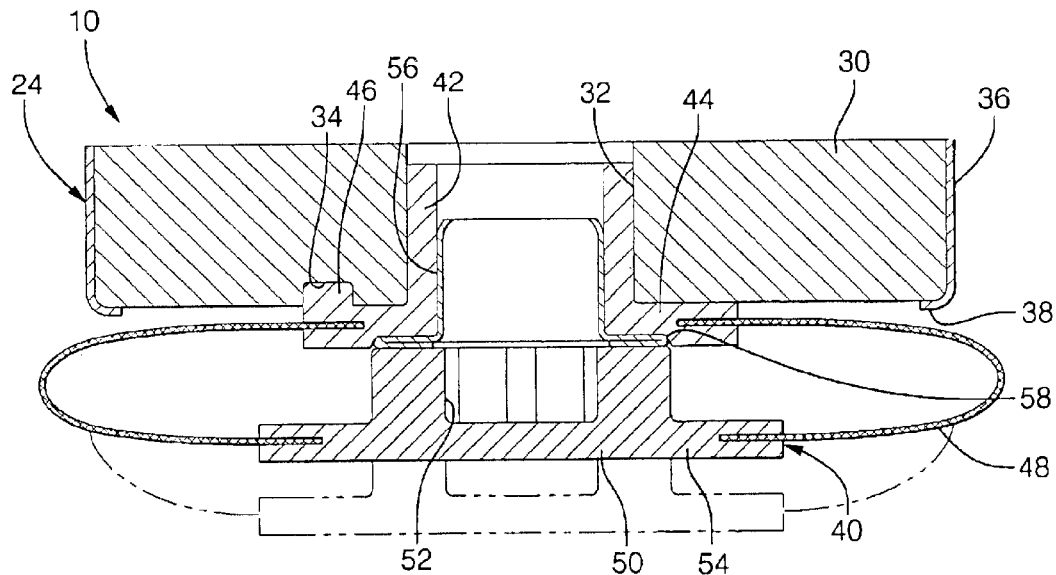
FIG. 3 is a view similar to FIG. 2 of the fuel strainer assembly of FIG. 1 illustrating final assembly.

Referring to FIGS. 2 and 3, the fuel pump 24 has an inlet body 30 with an inlet 32 at a bottom thereof. The inlet 32 is a counter-bore extending axially into the inlet body 30. The inlet body 30 also has a recess or groove 34 spaced radially from and adjacent to the inlet 32 for a function to be described. The fuel pump 24 also has an outer shell 36 that contains the inlet body 30 and secures the inlet body 30 in the axial direction using a rolled lip 38. It should be appreciated that the lip 38 of the outer shell 36 overlaps a portion of the inlet body 30. It should also be appreciated that the inlet body 30 may be formed by a conventional process such as a compression molding process.

Referring to FIGS. 1 through 3, the fuel strainer assembly 10 includes a fuel strainer 40 extending longitudinally. The fuel strainer 40 is generally rectangular in shape, but may be any suitable shape. The fuel strainer 40 has an inlet connector 42 that fits into the inlet 32 of the inlet body 30 of the fuel pump 24. The inlet connector 42 is a tubular member made of a rigid material such as metal or plastic, preferably nylon or acetal. The inlet connector 42 has an annular flange 44 extending radially from one end thereof. The annular flange 44 may include a small nib or tab 46 disposed in the recess 34 to act as an anti-rotation feature for the assembly 10. It should be appreciated that the inlet connector 42 is integral, unitary, and formed as one-piece.

The fuel strainer 40 includes a filtration member 48 connected to the inlet connector 42. The filtration member 48 is fabricated from a mesh or fibrous filtering material made of a plastic material, preferably nylon, to allow fuel to pass therethrough to the fuel pump 24, but prevent certain contaminants from passing therethrough to the fuel pump 24. The filtration member 48 has a particle retention rating of approximately thirty (30) microns to approximately eighty (80) microns. The filtration member 48 may be one or more layers connected to the connector 42 by conventional means.

The fuel strainer 40 also includes a push pad 50 connected to the filtration member 48 at a bottom thereof and aligned with the inlet connector 42. The push pad 50 is an annular member made of a rigid material such as metal or plastic, preferably nylon or acetal. The push pad 50 has a central cavity 52 for a function to be described. The push pad 50 also has an annular flange 54 extending radially from one end thereof. It should be appreciated that the push pad 50 is integral, unitary, and formed as one-piece.

The fuel strainer assembly 10 also includes a locking mechanism such as a compression retainer 56 to lock the inlet connector 32 to the fuel pump 24. The compression retainer 56 is a tubular member made of a rigid material such as metal, preferably steel. The compression retainer 56 has an annular flange 58 extending radially from one end thereof. The compression retainer 56 is disposed within the filtration member 44 and sets on the push pad 50. The compression retainer 56 has a slight draft complementary to an inside diameter of the inlet connector 42. It should be appreciated that the compression retainer 56 is disposed inside the fuel retainer 40 and sets freely inside the inside diameter of the inlet connector 42. It should also be appreciated that the push pad 50 prevents the compression retainer 56 from disengaging the inside diameter of the inlet connector 42.

To assemble the fuel strainer assembly 10 to the fuel pump 24, the inlet connector 42 is disposed axially in the inlet 32 of the inlet body 30. During insertion of the inlet connector 42 into the inlet 32 of the inlet body 30 of the fuel pump 24, the inlet connector 42 engages with the inlet 32 without interference. The push pad 50 is then pressed against the compression retainer 56. As the insertion depth of the compression retainer 56 increases, the inlet connector 42 compresses against the inside surface of the inlet 28, creating an extremely secure interference fit and preventing the fuel strainer 40 from disengaging from the fuel pump 24. It should be appreciated that fuel strainer 40 is retained with an axial insertion or push-on force (no rotation) It should also be appreciated that the inlet connector 42 and compression retainer 56 reliably secure the fuel strainer 40 to the inlet body 30 and the slot 34 and tab 46 locate a radial position of the fuel strainer 40, adding an anti-rotation feature to the assembly 10. It should further be appreciated that after the compression retainer 56 is in place, the push pad 50 falls down a distance such as three to four millimeters as illustrated by the phantom lines in FIG. 3.

Figure 4:
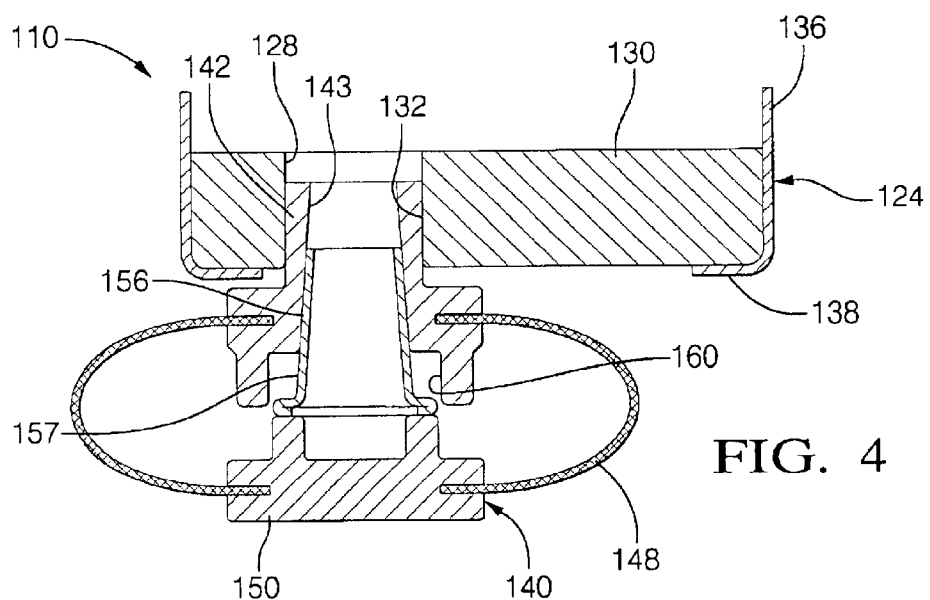
FIG. 4 is a fragmentary elevational view of another embodiment, according to the present invention, of the fuel strainer assembly of FIG. 1 illustrating pre-assembly.
Figure 5:
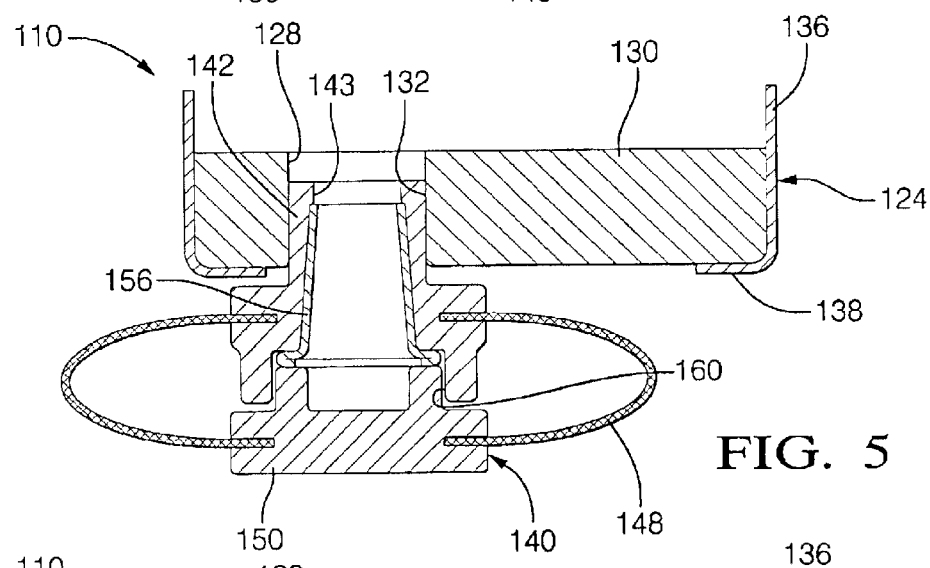
FIG. 5 is a view similar to FIG. 4 of the fuel strainer assembly of FIG. 4 illustrating partial assembly.
Figure 6:
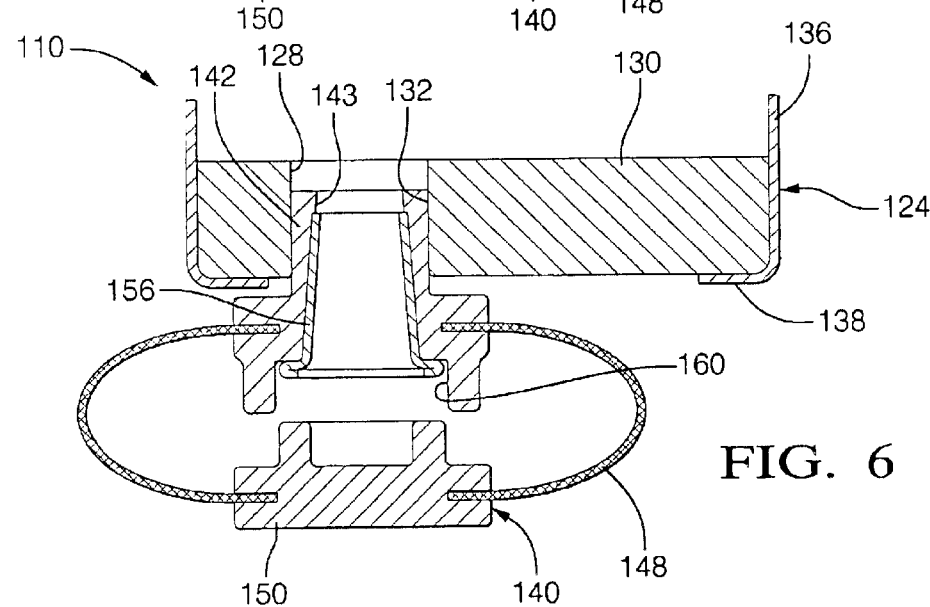
FIG. 6 is a view similar to FIG. 4 of the fuel strainer assembly of FIG. 4 illustrating final assembly.

Referring to FIGS. 4 through 6, another embodiment, according to the present invention, of the fuel strainer assembly 10 is shown. Like parts of the fuel strainer assembly 10 and fuel pump 24 have like reference numerals increased by one hundred (100). In this embodiment, the fuel strainer assembly 110 includes the fuel strainer 140 having the inlet connector 142, filtration member 148, and push pad 150. The fuel strainer assembly 110 eliminates the tab on the inlet connector 142. The inlet connector 142 has a slight draft or inclined inner surface 143 molded therein and the compression retainer 156 has a slight draft or inclined outer surface 157, allowing for the inlet connector 142 to be compressed against the entire inner surface 143 of the inlet 132 of the inlet body 130. The inlet connector 142 also has a lower cavity 160 extending axially therein to receive a portion of the push pad 150.

Additionally, in this embodiment, the fuel pump 124 includes the inlet body 130 having the inlet 132 and the outer shell 136 having the lip 138. The inlet body 130 is preferably made of a powered metal material.

To assemble the fuel strainer assembly 110 to the fuel pump 124, the inlet connector 142 is disposed axially in the inlet 132 of the inlet body 130. During installation of the inlet connector 142 into the inlet 132 of the inlet body 130 of the fuel pump 124, the inlet connector 142 engages with inlet 132 without interference. The push pad 150 is then pressed against the compression retainer 156. As the insertion depth of the compression retainer 156 increases, the inlet connector 142 compresses against the surface of the inlet 128, creating an extremely secure interference fit and preventing the fuel strainer 140 from disengaging from the fuel pump 124. It should also be appreciated that the inlet connector 142 and compression retainer 156 reliably secure the fuel strainer 140 to the inlet body 130. It should further be appreciated that after the compression retainer 156 is in place the push pad 150 falls down a distance such as three to four millimeters as illustrated in FIG. 6.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fuel strainer assembly comprising:
   a filtration member;
   an inlet connector connected to said filtration member for connection to an inlet of a fuel pump;
   a push pad connected to said filtration member; and
   a compression retainer operatively supported by said push pad to engage said inlet connector to cause an interference fit between said inlet connector and the inlet of the fuel pump to secure said inlet connector to the fuel pump.

2. A fuel strainer assembly as set forth in claim 1 wherein said compression retainer is a generally tubular member.

3. A fuel strainer assembly as set forth in claim 2 wherein said compression retainer has an inclined outer surface.

4. A fuel strainer assembly as set forth in claim 1 wherein said inlet connector is a generally tubular member.

5. A fuel strainer assembly as set forth in claim 4 wherein said inlet connector has an inclined inner surface.

6. A fuel strainer assembly as set forth in claim 1 wherein said inlet connector has a tab for being received in a notch of the fuel pump.

7. A fuel strainer assembly as set forth in claim 1 wherein said compression retainer has a tubular portion disposed in said inlet connector.

8. A fuel strainer assembly as set forth in claim 1 wherein said inlet connector is made of a plastic material.

9. A fuel strainer assembly as set forth in claim 1 wherein said compression retainer is made of a metal material.

10. A fuel strainer assembly comprising:

a fuel pump having an inlet body with an inlet therein;

a fuel strainer for connection to said inlet of said fuel pump; and said fuel strainer having an inlet connector disposed in said inlet of said fuel pump and a compression retainer disposed at least partially within said inlet connector to cause an interference fit between said inlet connector and said inlet of said fuel pump to secure said inlet connector to said fuel pump.

11. A fuel strainer assembly as set forth in claim 10 wherein said inlet body has a notch spaced from said inlet.

12. A fuel strainer assembly as set forth in claim 11 wherein said inlet connector has a tab for being received in a notch of said fuel pump.

13. A fuel strainer assembly as set forth in claim 10 wherein said fuel strainer further comprises a filtration member connected to said inlet connector.

14. A fuel strainer assembly as set forth in claim 13 wherein said fuel strainer further comprises a push pad connected to said filtration member.

15. A fuel strainer assembly as set forth in claim 10 wherein said compression retainer is a generally tubular member.

16. A fuel strainer assembly as set forth in claim 15 wherein said compression retainer has an inclined outer surface.

17. A fuel strainer assembly as set forth in claim 16 wherein said inlet connector is a generally tubular member.

18. A fuel strainer assembly as set forth in claim 17 wherein said inlet connector has an inclined inner surface.

19. A fuel strainer assembly as set forth in claim 17 wherein said compression retainer has a tubular portion disposed in said inlet connector.

20. A fuel tank assembly for a vehicle comprising:

a fuel tank;

a fuel pump disposed in said fuel tank and having an inlet body with an inlet therein;

a fuel strainer assembly operatively connected to said inlet; and said fuel strainer assembly comprising a filtration member, an inlet connector connected to said filtration member and being disposed in said inlet of said fuel pump, a push pad connected to said filtration member, and a compression retainer operatively supported by said push pad to engage said inlet connector to cause an interference fit between said inlet connector and said inlet of said fuel pump to secure said inlet connector to said fuel pump.

* * * * *